United States Patent [19]
Ohtsu et al.

[11] Patent Number: 5,476,310
[45] Date of Patent: Dec. 19, 1995

[54] BRAKING APPARATUS FOR ELECTRIC VEHICLE

[75] Inventors: Eiichi Ohtsu, Mito; Shotaro Naito; Shigeru Kuriyama, both of Katsuta, all of Japan

[73] Assignee: Hitachi, Ltd., Japan

[21] Appl. No.: 239,121

[22] Filed: May 6, 1994

[30] Foreign Application Priority Data

May 14, 1993 [JP] Japan .................. 5-113088

[51] Int. Cl.⁶ .............. B60T 11/20; B60T 11/28; B60T 13/66; B60T 13/74
[52] U.S. Cl. .............. 303/3; 180/165; 188/156; 188/158; 303/20; 303/113.4; 303/152
[58] Field of Search ............... 303/3, 2, 100, 303/112, 113.2, 113.1, 20, 102–111, 15; 180/165, 197, 65.1–65.8, 233, 242, 244, 246, 248, 250; 364/426.4, 426.02, 426.03; 318/12–13, 53, 139, 376, 375; 188/181 T, 156, 158–165

[56] References Cited

U.S. PATENT DOCUMENTS

| | | | |
|---|---|---|---|
| 3,621,929 | 11/1971 | Oberthur et al. | 188/156 |
| 4,242,617 | 12/1980 | Jennings | 318/13 |
| 4,363,999 | 12/1982 | Preikschat | 318/53 |
| 4,419,610 | 12/1983 | Pollman | 318/12 |
| 4,671,577 | 6/1987 | Woods | 188/156 X |
| 4,753,493 | 6/1988 | Arikawa | 303/111 X |
| 4,776,644 | 10/1988 | Arikawa | 303/111 |
| 4,818,037 | 4/1989 | McEnnan | 303/97 |
| 4,962,969 | 10/1990 | Davis | 303/100 X |
| 5,253,929 | 10/1993 | Ohori | 188/156 X |
| 5,287,772 | 2/1994 | Aoki et al. | 180/165 X |
| 5,294,191 | 3/1994 | Giorgatti et al. | 180/165 X |
| 5,318,355 | 6/1994 | Asanuma et al. | 180/165 |
| 5,322,352 | 6/1994 | Ohno et al. | 303/3 |
| 5,333,706 | 8/1994 | Mori | 188/156 |
| 5,358,317 | 10/1994 | Cikanek | 303/100 |
| 5,378,053 | 1/1995 | Patient et al. | 303/3 |
| 5,399,000 | 3/1995 | Aoki et al. | 303/3 |
| 5,421,643 | 6/1995 | Kircher et al. | 303/3 |

FOREIGN PATENT DOCUMENTS

| | | |
|---|---|---|
| 1-126103 | 5/1989 | Japan . |
| 1-252102 | 10/1989 | Japan . |
| 3-60302 | 3/1991 | Japan . |
| 4-150702 | 5/1992 | Japan . |

*Primary Examiner*—Douglas C. Butler
*Attorney, Agent, or Firm*—Evenson, McKeown, Edwards & Lenahan

[57] ABSTRACT

A braking apparatus for an electric vehicle in which a mechanical anti-lock brake and regenerative braking cooperate with each other to improve a braking performance is realized. On condition that an accelerator is released off, the wheel rotation number is large, and a brake is trod on, a large regeneration mode is selected by a motor controller when a wheel slip is small, and a regeneration mode is selected when the wheel slip is large. When the wheel slip is small, the braking force exerted on each wheel is increased by the brake controller and the regenerative braking force is also increased so that a slip ratio comes quickly closer to 0.2. When the wheel slip is large, the brake controller reduces the braking force so that the slip ratio comes closer to 0.2. In this case, the regenerative braking force is smaller than the above case of the small wheel slip to such an extent that the operation of the brake controller is not disturbed. On condition that the accelerator is released off, the wheel rotation number is large, and the brake is released off, the regeneration mode is selected when the regeneration switch is turned on, and a coasting mode is selected when the regeneration switch is turned off.

7 Claims, 10 Drawing Sheets

| ACCELERATOR | NUMBER OF ROTATIONS | BRAKE | REGENERATION SWITCH | SLIP | MODE |
|---|---|---|---|---|---|
| OFF | LARGE | ON | — | SMALL | LARGE REGENERATION |
| OFF | LARGE | ON | — | LARGE | REGENERATION |
| OFF | LARGE | OFF | ON | — | REGENERATION |
| OFF | SMALL | OFF | OFF | — | COASTING |
| ON | — | — | — | — | POWER PROPULSION |

| ACCELERATOR | NUMBER OF ROTATIONS | BRAKE | REGENERATION SWITCH | BRAKE PRESSURE | MODE |
|---|---|---|---|---|---|
| OFF | LARGE | ON | — | SMALL | LARGE REGENERATION |
| OFF | LARGE | ON | — | LARGE | REGENERATION |
| OFF | LARGE | OFF | ON | | REGENERATION |
| OFF | SMALL | OFF | OFF | — | COASTING |
| ON | — | — | — | — | POWER PROPULSION |

FIG.11

BRAKING APPARATUS FOR ELECTRIC VEHICLE

BACKGROUND OF THE INVENTION

The present invention relates to a braking apparatus for speed-reduction or stop control of an electric vehicle driven by the power from a battery.

There is known an electric vehicle of the type that electrical energy from an external power source is supplied to a vehicle-mounted battery for charging the battery, and the vehicle is driven with the charged energy. For example, a braking apparatus for an electric-powered vehicle is disclosed in JP,A, 1-126103 as a braking apparatus for speed-reduction or stop control of such an electric vehicle. In this braking apparatus for an electric-powered vehicle, a mechanical braking force and an electrical braking force are applied to surely speed down or to stop the vehicle. Alternatively, in the braking apparatus, the mechanical braking force is controlled so that the sum of the mechanical braking force and the electrical braking force becomes a commanded braking force, and the regenerative energy due to the electrical braking force is effectively supplied to a battery.

Also, a motor controller for an electrically driven vehicle disclosed in JP, A, 1-252102 is arranged such that, while the vehicle is traveling at a high speed, regenerative braking is effected upon a service brake being actuated by a brake pedal, thereby increasing a braking performance.

A slip determining device and a traction controller for a battery vehicle is disclosed in JP,A, 3-60302. In this traction controller, a traveling motor is controlled so that tires do not slip at the time of start-up on slippery roads such as ones covered with snow. More specifically, a slip ratio of a vehicle road wheel is calculated and, based on the calculated slip ratio, the traveling motor is controlled so as to prevent the wheel from slipping.

In an electric car controller disclosed in JP, A, 4-150702, regenerative braking is subject to an anti-lock brake process when a driving wheel is brought into a locked state. In the anti-lock brake process, a slip ratio of the wheel is detected and, when the slip ratio is greater than a set value, a regenerative braking command is limited and the slip ratio is controlled to become smaller. When the slip ratio is smaller than the set value, a regenerative braking force is increased and the slip ratio is controlled to become larger.

In an electric vehicle with a regenerative braking function disclosed in U.S. Pat. No. 4,242,617, a rotary shaft of a traveling motor and a rotary shaft of an alternator coupled to each other through a control differential gear mechanism, and an output shaft of the control differential gear mechanism is coupled to wheels through a vehicular differential gear mechanism. While the vehicle is traveling, electric power from a battery is supplied to the traveling motor so that the traveling motor is driven to rotate the wheels. When stopping the vehicle, the supply of electric power to the traveling motor is stopped upon a brake pedal being tread on, and a field current depending on the tread amount of a brake pedal is supplied to a field winding of the alternator. The electric power produced by the alternator is supplied to the battery. When the tread amount of the brake pedal is increased, the traveling motor is stopped by a mechanical brake.

Other examples of the regenerative braking for an electric vehicle, similarly to the above one described in U.S. Pat. No. 4,242,617, are disclosed in U.S. Pat. Nos. 4,419,610 and 4,363,999.

As one example of a braking apparatus for vehicles driven by internal combustion engines rather than electric vehicles, there is also known an antiskid controller for a vehicular braking apparatus disclosed in U.S. Pat. No. 4,776,644. This antiskid controller is intended to prevent wheels of the vehicle from being locked. A wheel speed is detected by a wheel speed sensor and, when a deceleration of the wheel exceeds a preset value, the brake pressure is reduced. When the wheel deceleration becomes smaller than a preset value, the brake pressure is increased. The vehicle wheels are thereby prevented from being locked.

Other examples of a braking apparatus for vehicles driven by internal combustion engines are disclosed in U.S. Pat. Nos. 4,818,037 and 4,753,493.

SUMMARY OF THE INVENTION

In order that an electric vehicle is stably stopped even on slippery roads and the like, it is contemplated to apply a mechanical anti-lock brake, which is equipped on a gasoline engine vehicle and so on, to the electric vehicle. It is also conceivable that the cooperative use of a mechanical anti-lock brake and regenerative braking in the electric vehicle improves a braking performance. Such an improvement in the braking performance would be effective in a vehicle which has a great weight and is started up and stopped frequently, e.g., a garbage wagon.

In a conventional braking apparatus for an electric vehicle, however, no considerations have been paid to the cooperative use of a mechanical anti-lock brake and regenerative braking.

Accordingly, an object of the present invention is to provide a braking apparatus for an electric vehicle in which a mechanical anti-lock brake and regenerative braking are combined with each other and hence a braking performance is improved.

To achieve the above object, according to the present invention, there is provided a braking apparatus for controlling braking of an electric vehicle including a traveling electric motor, brake operating means, accelerator operating means, and wheel braking means, wherein the braking apparatus comprises wheel braking control means for calculating a slip ratio between wheels and a road surface, controlling the wheel braking means so that the slip ratio is kept at a predetermined value, and electric braking means for regeneratively braking the traveling electric motor when the slip ratio is smaller than the predetermined value in accordance with the magnitude of a signal corresponding to the slip ratio calculated by the wheel braking control means and a tread signal from the brake operating means.

In the above braking apparatus for an electric vehicle, preferably, the electric braking means also brakes the traveling electric motor when the slip ratio is reduced by the wheel braking control means, while setting a regenerative braking force produced when the slip ratio is smaller than the predetermined value to be larger than a regenerative braking force produced when the slip ratio exceeds the predetermined value.

Preferably, the above braking apparatus for an electric vehicle further comprises regeneration selecting means for selecting whether regenerative braking is to be applied or not, wherein when the regeneration selecting means is set to apply the regenerative braking, the electric braking means brakes the electric motor with the regenerative braking upon determining the condition that the brake operating means and the accelerator operating means are both not operated.

In the above braking apparatus for an electric vehicle, preferably, the electric braking means brakes the electric motor with the regenerative braking when the slip ratio is smaller than the predetermined value, and stops the regenerative braking when the slip ratio exceeds the predetermined value.

Preferably, the above braking apparatus for an electric vehicle further comprises regeneration selecting means for selecting whether regenerative braking is to be applied or not, wherein when the regeneration selecting means is set to apply the regenerative braking, the electric braking means brakes the electric motor with the regenerative braking upon determining the condition that the brake operating means and the accelerator operating means are both not operated, while setting a regenerative braking force produced when the slip ratio is smaller than the predetermined value to be larger than a regenerative braking force produced when the regeneration selecting means is set to apply the regenerative braking.

In the above braking apparatus for an electric vehicle, preferably, a brake pressure signal indicating a brake pressure of the wheel braking means is supplied to the electric braking means, and the electric braking means brakes the electric motor with the regenerative braking when the brake pressure signal exceeds a predetermined value, and stops the regenerative braking when the brake pressure signal is smaller than the predetermined value.

Preferably, the above braking apparatus for an electric vehicle further comprises regeneration selecting means for selecting whether regenerative braking is to be applied or not, wherein when the regeneration selecting means is set to apply the regenerative braking, the electric braking means brakes the electric motor with the regenerative braking upon determining the condition that the brake operating means and the accelerator operating means are both not operated.

When a braking torque is exerted on a wheel, an outer circumferential speed of the wheel becomes smaller than a vehicle speed, thereby causing a slip. By keeping a slip ratio, which is given by a ratio of the speed difference between the wheel and the vehicle to the vehicle speed, at a predetermined value (approximately 0.2), a maximum braking force can be obtained while maintaining stability of the vehicle. Under the condition that the brake operating means is being operated, when the slip ratio is smaller than the predetermined value, the wheel braking control means increases the wheel braking force produced by the wheel braking means. At this time, the electric motor is also electrically braked by the electric braking means so that a speed of the slip ratio approaching the predetermined value is accelerated. When the slip ratio exceeds the predetermined value, the wheel braking control means reduces the wheel braking force produced by the wheel braking means. At this time, the electric braking means stops or reduces the electrical braking force applied to the electric motor.

Accordingly, a braking apparatus for an electric vehicle in which a mechanical anti-lock brake as the mechanical braking means and electrical regenerative braking cooperate with each other to improve a braking performance is realized.

BRIEF DESCRIPTION OF THE DRAWINGS

FIG. 8(a–d is a waveform chart showing the relationship among a wheel slip, a wheel speed, a wheel acceleration/deceleration, and a brake pressure.

DETAILED DESCRIPTION OF THE PREFERRED EMBODIMENTS

Hereinafter, preferred embodiments of the present invention will be described with reference to the accompanying drawings.

Figure 1:
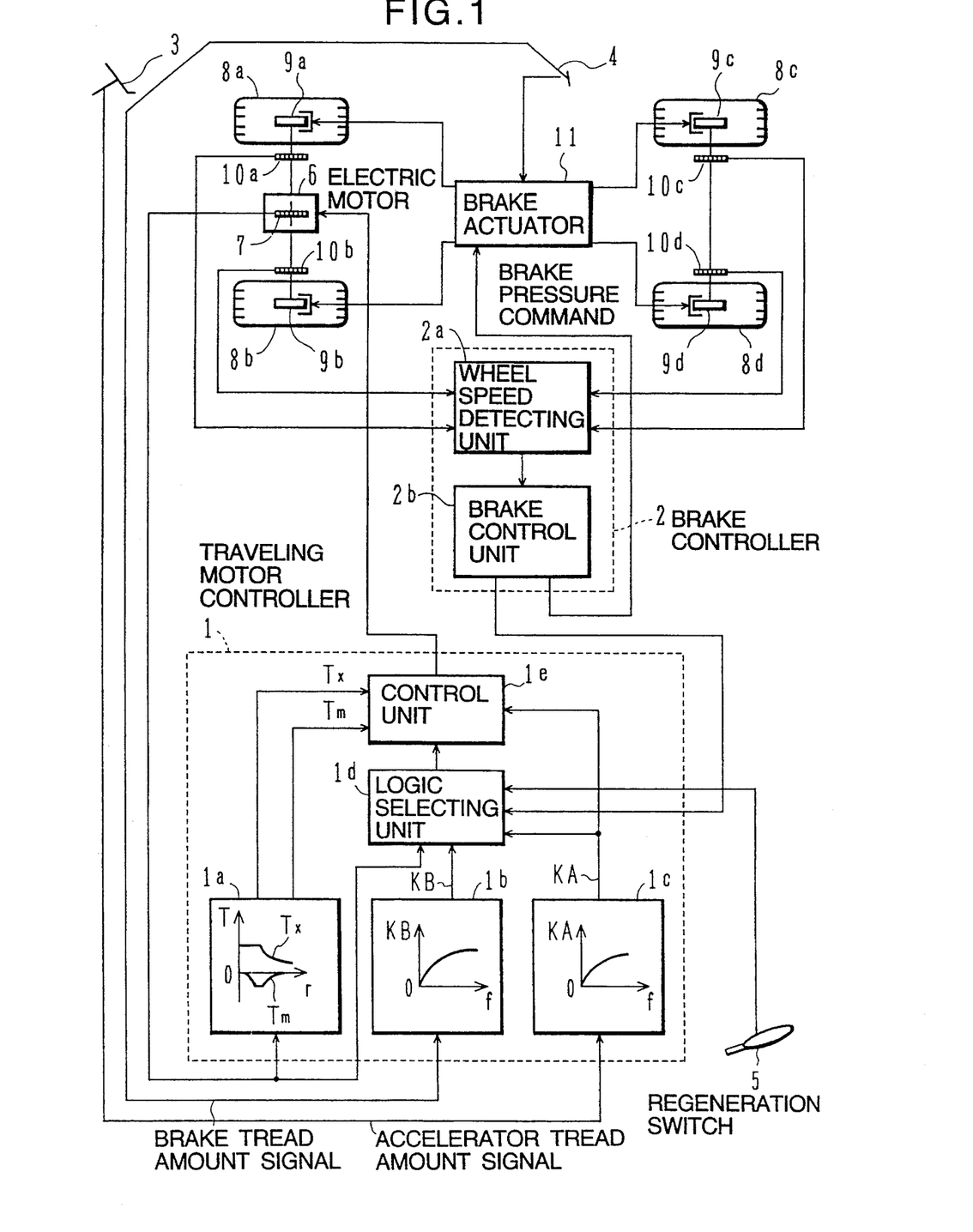
FIG. 1 is a schematic view of the construction of one embodiment of the present invention.

FIG. 1 is a schematic view of the construction of one embodiment of the present invention. In FIG. 1, vehicle road wheels 8a, 8b, 8c, 8d are respectively provided with brakes 9a, 9b, 9c, 9d (wheel braking means) and rotation number sensors 10a, 10b, 10c, 10d. A wheel speed detecting unit 2a of a brake controller 2 (wheel braking control means) takes in rotation number detection signals from the rotation number sensors 10a, 10b, 10c, 10d and calculates a wheel speed from the taken-in detection signals. The calculated wheel speed is supplied to a brake control unit 2b. From the supplied wheel speed, the brake control unit 2b calculates a wheel acceleration/deceleration and, from the calculated wheel acceleration/deceleration and the wheel speed, calculates a vehicle speed. Then, the brake control unit 2b calculates a slip ratio from the vehicle speed and the wheel speed both calculated.

It is generally anticipated that, when the brakes start operation to gradually increase the braking force for reducing the wheel speed and the wheel deceleration reaches a predetermined value, the wheels are brought into a locked state. Upon the wheels being brought into the locked state, the vehicle speed can no longer be calculated from the wheel speed. Therefore, when the wheel deceleration reaches the predetermined value, the brake control unit 2b calculates a tangent (differential value) of the wheel speed at that time. Then, the brake control unit 2b takes a value along the tangent as a calculative vehicle speed and calculates a slip ratio therefrom. This calculated vehicle speed is used until the wheel speed is increased to a predetermined value (see reference, "Automobile Technology Handbook", Automobile Technology Association (cooperation), Vol. 1, Section of basic theory, Chapter 4 Basis and theory of braking performance, pp. 132 to 134 (FIG. 4–37)).

The brake control unit 2b supplies a slip signal indicating the slip ratio to a logic selector 1d of a traveling motor controller 1 (electric braking means), and also supplies a brake pressure command signal to a brake actuator 11 (wheel braking means) so that the slip ratio is held in the range of 0.1 to 0.3. In accordance with the brake pressure command signal from the brake control unit 2b, the brake actuator 11 controls the brake pressure from a brake pedal 4 (brake operating means) for actuating the brakes 9a, 9b, 9c, 9d to thereby apply braking torques to the wheels 8a, 8b, 8c, 8d. The slip signal is, for example, a pulse signal having a constant period (e.g., 2 Hz) of which pulse width is varied depending on the magnitude of a slip.

The traveling motor controller 1 comprises a torque command generator 1a, a brake command generator 1b, an accelerator command generator 1c, a logic selector 1d, and a control unit 1e. The slip signal from the brake controller 2 and a regeneration on/off signal from a regeneration switch 5 (regeneration selecting means) are both supplied to the logic selector 1d. A rotation number signal from a rotation number sensor 7 associated with an electric motor 6 is supplied to both the torque command generator 1a and the logic selector 1d. Further, a brake tread amount signal from the brake pedal 4 is supplied to the brake command generator 1b, and an accelerator tread amount signal from an accelerator pedal 3 (accelerator operating means) is supplied to the accelerator command generator 1c.

The torque command generator 1a stores a torque command Tx having a characteristic with which the torque is held constant until the wheel rotation number reaches a fixed preset value and is gradually reduced when the wheel rotation number exceeds the fixed value, and a torque command Tm having a characteristic with which the torque is reduced from 0 to a preset negative value depending on the wheel rotation number, maintained at the preset negative value in a preset range of rotation number, and then gradually increased to come closer to 0 with an increase in the wheel rotation number. Then, the torque command generator 1a supplies the torque commands Tx and Tm to the control unit 1e in accordance with the wheel rotation number signal supplied thereto.

The brake command generator 1b stores a brake command KB of which value is increased curvilinearly depending on the brake tread amount, and supplies the brake command to the logic selector 1d in accordance with the brake tread amount signal supplied thereto.

Also, the accelerator command generator 1c stores an accelerator command KA of which value is increased curvilinearly depending on the accelerator tread amount, and supplies the accelerator command to the logic selector 1d in accordance with the accelerator tread amount signal supplied thereto.

The logic selector 1d selects one of later-described modes based on the wheel rotation number, the brake command KB, accelerator command KA, the slip signal and the regeneration on/off signal, and supplies a signal indicating the selected mode to the control unit 1e. The control unit 1e controls driving of the electric motor 6 based on the mode signal, the torque commands Tx, Tm and the accelerator command KA. The electric motor 6 drives the wheels 8a, 8b for traveling the electric vehicle. The regeneration switch 5 is a switch operated by, e.g., a driver for selecting whether the regeneration is to be turned on or off. If the regeneration is selected to turn on (effect), the regenerative braking is applied just upon the accelerator pedal 3 being released off, even with the brake pedal 4 not trod on, when the wheel rotation number is large. The regeneration switch 5 corresponds to an on/off switch of an exhaust brake equipped on diesel trucks, etc.

Figure 2:
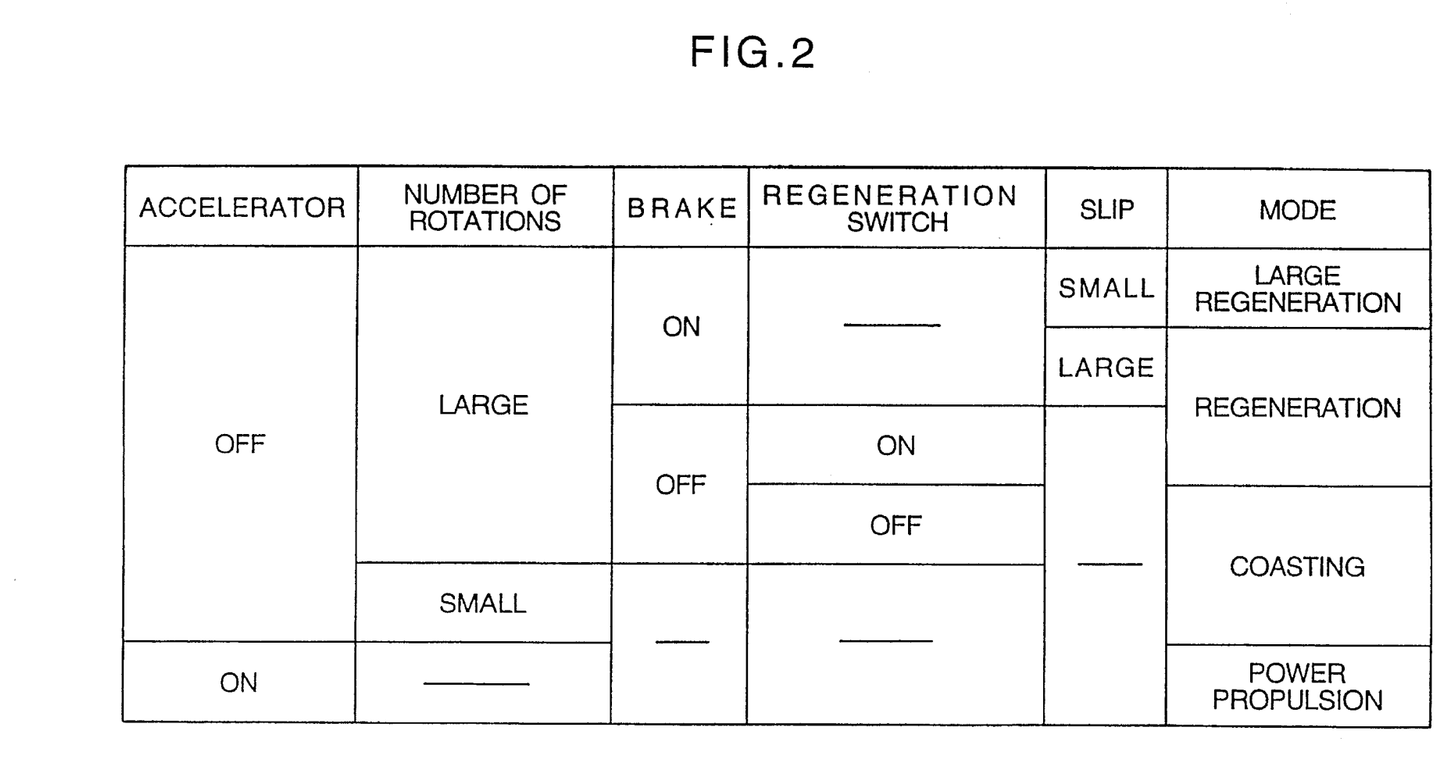
FIG. 2 is a diagram showing a control mode selection logic in the embodiment of FIG. 1.

FIG. 2 is a diagram showing a control mode selection logic utilized by the traveling motor controller 1 for driving the electric motor 6. As seen from FIG. 2, on condition that the accelerator pedal 3 is released off, the wheel rotation number is large, and the brake pedal 4 is trod on, a large regeneration mode is selected when the wheel slip is small (e.g., when the slip ratio is not greater than 0.2), and a regeneration mode (i.e., a normal regenerative braking force) is selected when the wheel slip is large (e.g., when the slip ratio is greater than 0.2). In other words, when the wheel slip is small, the braking force exerted on each of the wheels is increased by the brake controller 2 and the regenerative braking force is also increased so that the slip ratio comes quickly closer to 0.2. When the wheel slip is large, the brake controller 2 reduces the braking force so that the slip ratio comes closer to 0.2. In this case, the regenerative braking force is smaller than the above case of the small wheel slip to such an extent that the operation of the brake controller 2 is not disturbed.

Also, on condition that the accelerator pedal 3 is released off, the wheel rotation number is large, and the brake pedal 4 is released off, the regeneration mode is selected when the regeneration switch 5 is turned on, and a coasting mode is selected when the regeneration switch 5 is turned off. Further, on condition that the accelerator pedal 3 is released off and the wheel rotation number is small, the coasting mode is selected. On condition that the accelerator pedal 3 is trod on, a power repulsion mode is selected.

In the example of FIG. 2, whether the wheel rotation number is large or small is determined in consideration of whether the regenerative braking is effectively exerted on the electric motor 6 or not and whether the vehicle can maintain a stable state or not. If the wheel rotation number is larger than 500 rpm, by way of example, it is determined to be large.

Additionally, in the example of FIG. 2, in the large regeneration mode, a current value of the electric motor 6 is controlled so that the motor 6 produces a torque of, e.g., approximately 7 kgm. In the regeneration mode, a current value of the electric motor 6 is controlled so that the motor 6 produces a torque of, e.g., approximately 3 kgm. The current values which can produce the respective torques are calculated in advance.

A description will now be made of a control method for the electric motor 6 in each of the above modes.

Figure 3:
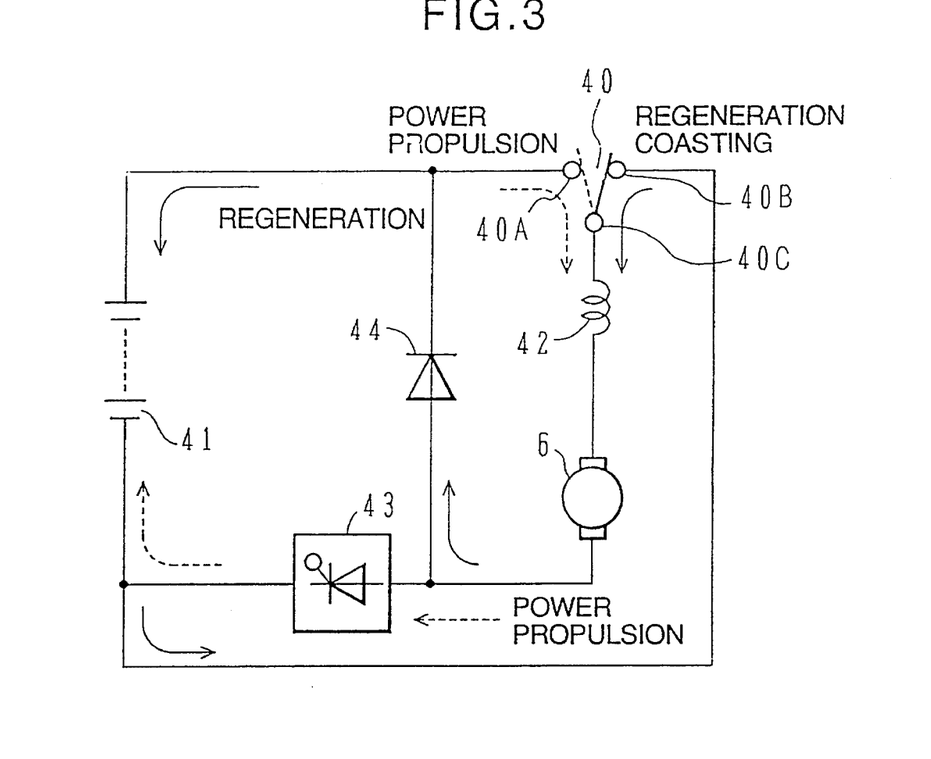
FIG. 3 is a schematic view of a control circuit of an electric motor.

FIG. 3 is a schematic view of a control circuit of the electric motor 6. In FIG. 3, a contactor 40 is switched between the side of a terminal 40A (the power propulsion side) and the side of a terminal 40B (the regeneration/coasting side) in response to a switching signal from the traveling motor controller 1. A fixed terminal 40C of the contactor 40 is connected to the terminal 40A of the contactor 40 through a DC reactor 42, the electric motor 6 and a diode 44. The junction between the terminal 40A and the diode 44 is connected to the junction between the electric motor 6 and the diode 44 through a battery 41 and a thyristor 43 (switching device). Further, the junction between the battery 41 and the thyristor 43 is connected to the terminal 40B of the contactor 40.

When the power propulsion mode for traveling the vehicle is selected, the contactor 40 is switched to the power repulsion side (the side of the terminal 40A as indicated by a broken line) in response to the switching signal from the traveling motor controller 1. This causes a current to flow from the battery 41 through the terminals 40A, 40C of the contactor 40, the DC reactor 42, the motor 6 and the thyristor 43 to the battery 41. In accordance with the tread amount signal from the accelerator pedal 3 and so on, the motor controller 1 supplies an intermittent signal to the thyristor 43, thereby controlling the current passing the motor 6.

When the large regeneration mode or the regeneration mode is selected, the contactor 40 is switched to the regeneration/coasting side (the side of the terminal 40B as indicated by a solid line) in response to the switching signal from the controller 1. In this case, the motor 6 is driven by the wheels 8a, 8b so that the motor 6 serves as an electric generator to reduce the wheel speed. The thyristor 43 is first turned on by a signal from the motor controller 1. This causes a current to flow from the motor 6 through the thyristor 43, the terminals 40B, 40C and the DC reactor to the motor 6, whereby energy is accumulated in the DC reactor 42. The thyristor 43 is then turned off. This causes a current to flow from the motor 6 through the diode 44, the battery 41, the terminals 40B, 40C and the DC reactor to the motor 6. In this way, the thyristor 48 is turned on and off to carry out regenerative control.

Figure 4A:
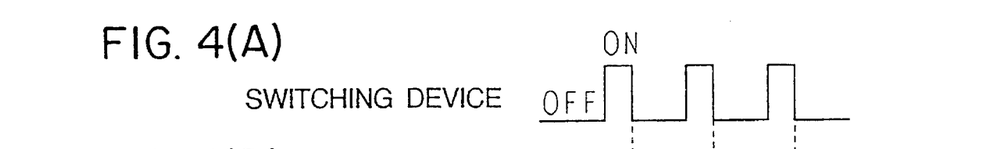
FIG. 4a–4b is a chart showing the relationship between turning-on/off of a switching device and a battery current during regeneration.
Figure 4B:
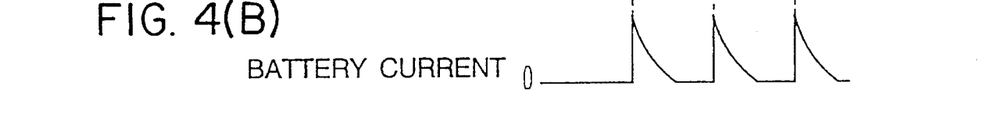

FIG. 4 shows turning-on/off of the thyristor 43 (FIG. 4(A)) and a current of the battery 41 (FIG. 4(B)) during the large regeneration mode or the regeneration mode. Each time the thyristor 48 as the switching device is turned off, the battery 41 is charged repeatedly. The case of the thyristor 43 having a large off-period represents the large regeneration mode in which the wheel braking force is increased. Also, the case of the thyristor 43 having a small off-period represents the regeneration mode in which the wheel braking force is reduced.

When the coasting mode is selected, the contactor 40 is switched to the regeneration/coasting side (the side of the terminal 40B) in response to the switching signal from the controller 1. In this case, the on/off operation of the thyristor 43 is stopped so that the wheels are driven by a coasting force.

Figure 5:
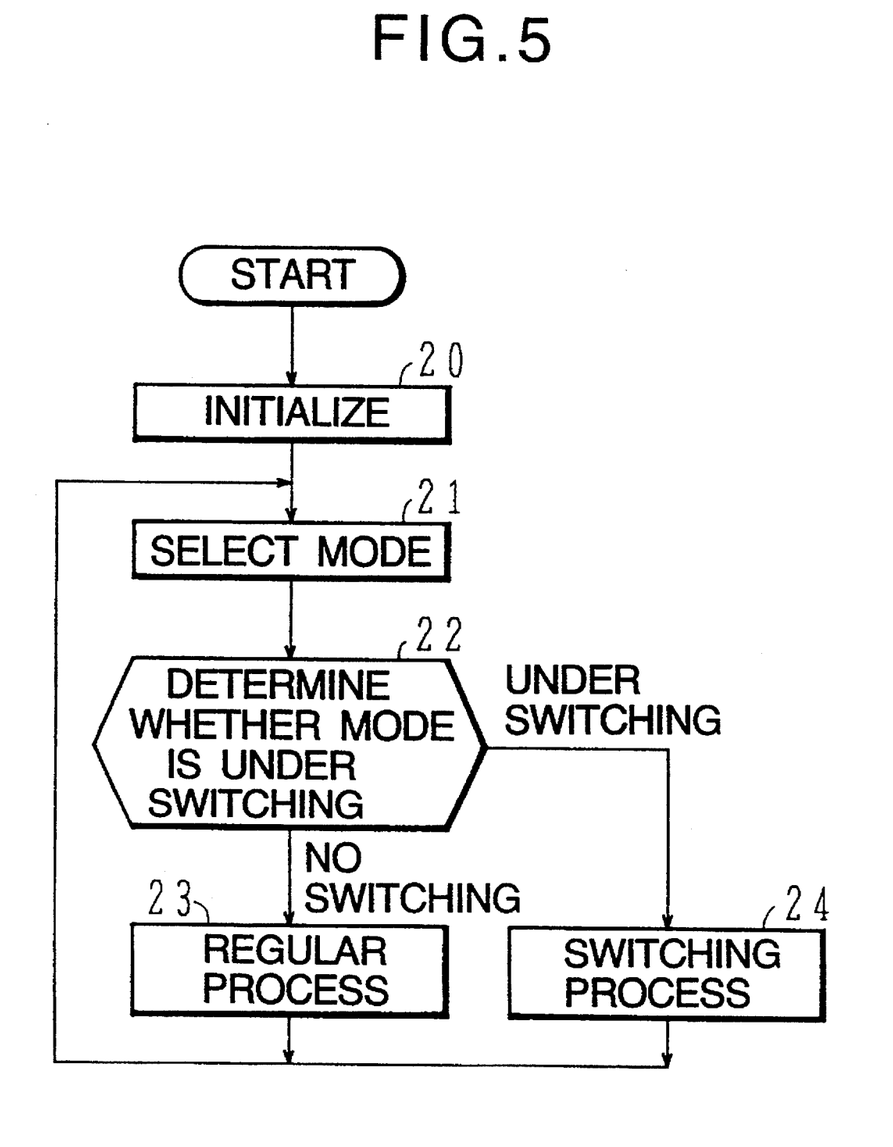
FIG. 5 is a schematic flowchart for the operation of a motor controller.

FIG. 5 shows a schematic operation flow of the traveling motor controller 1.

In step 20 of FIG. 5, the controller is initialized. More specifically, when a microcomputer, for example, is employed as the controller 1, the microprocessor is subject to initialization for setting its inputs/outputs, registers, memories, etc. to initial states. Then, the process goes to step 21 where the control mode of the motor 6 is selected based on the control mode selection logic shown in FIG. 2.

Figure 6:
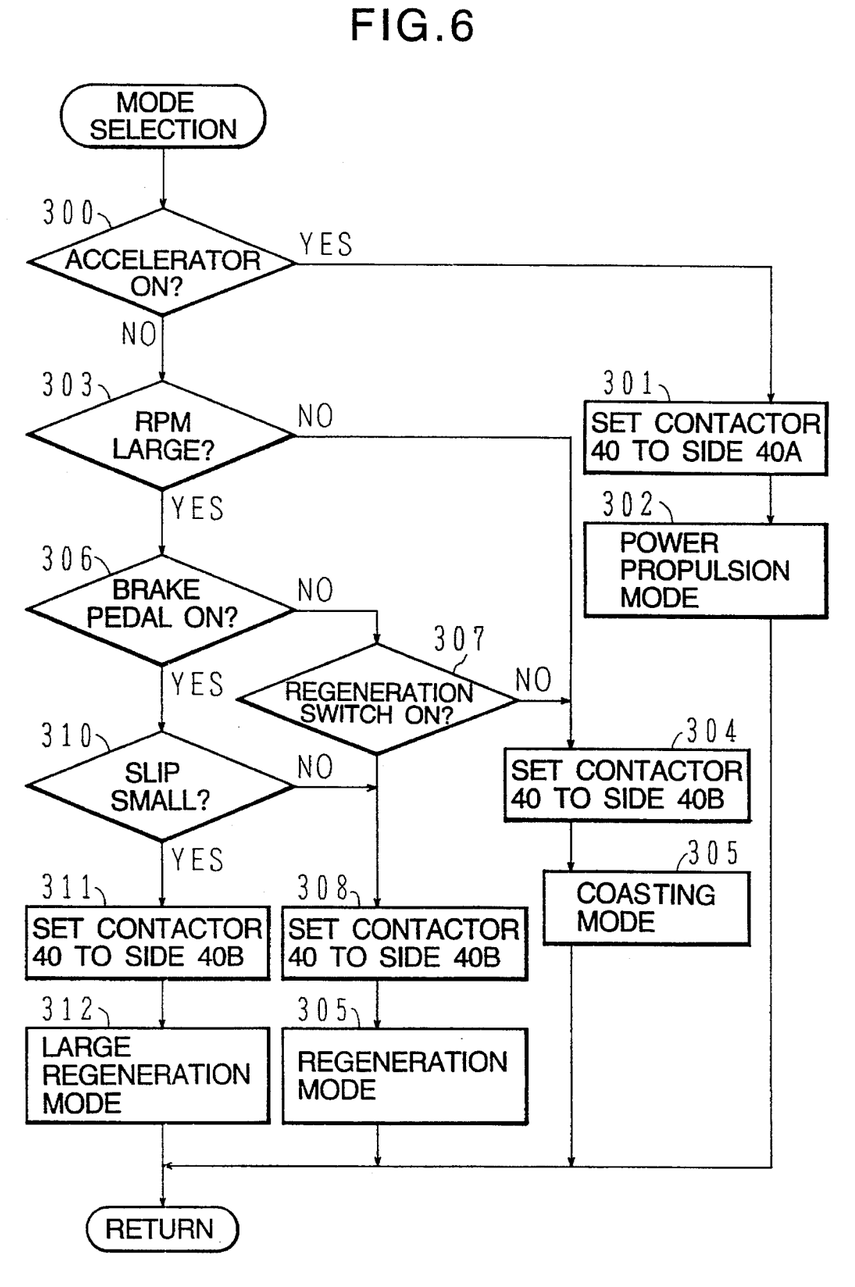
FIG. 6 is a flowchart for mode selection in the flowchart of FIG. 5.

FIG. 6 is a detailed flowchart for mode selection. In step 300 of FIG. 6, it is determined whether the accelerator pedal 3 is tread on or not. If the accelerator pedal 3 is tread on, then the process goes to step 301 for setting the contactor 40 to the side of the terminal 40A. Thereafter, the power propulsion mode is set in step 302. In the power propulsion mode, when the accelerator pedal 3 is fully opened, the control unit 1e sets a target torque in accordance with the torque command Tx, for thereby driving tile electric motor 6. When the tread amount of the accelerator pedal 4 is intermediate, the control unit 1e sets, as a target torque, the value resulted by multiplying the sum of the torque commands Tx and Tm by a coefficient depending on the accelerator tread amount, for thereby driving the electric motor 6. After that, the process returns to step 300.

If the accelerator pedal 3 is released off in step 300, then it is determined in step 303 whether the rotation number of the wheel or the motor 6 is large or not. If not, then the process goes to step 304. In step 304, the contactor 40 is set to the side of the terminal 40B. Subsequently, the coasting mode is set in step 305. In the case of the coasting mode, the control unit 1e sets a target torque to 0. After that, the process returns to step 300.

If the rotation number is large in step 303, then it is determined in step 306 whether the brake pedal 4 is trod on or not. If the brake pedal 4 is not trod on, then the process goes to step 307 to determine whether the regeneration switch 5 is turned on or not. If the regeneration switch 5 is not turned on, then the process goes to step 304 and, if it is turned on, then the process goes to step 308. In step 308, the contactor 40 is set to the side of the terminal 40B. Subsequently, the regeneration mode is set in step 309. In the case of the regeneration mode, the control unit 1e sets, as a target torque, the value resulted by multiplying the torque command Tm by a coefficient smaller than 1. After that, the process returns to step 300.

If the brake pedal 4 is turned on in step 306, then the process goes to step 310 to determine whether the slip is small or not. If the slip is not small, then the process goes to step 308 and, if it is small, then the process goes to step 311. In step 311, the contactor 40 is set to the side of the terminal 40B. Subsequently, the large regeneration mode is set in step 312. In the case of the large regeneration mode, the control unit 1e sets the command torque Tm as a target torque. After that, the process returns to step 300.

After executing the mode selection in step 21 of FIG. 5, the process goes to step 22. In step 22, it is determined whether the control mode set previously is switched or not. If the control mode is not switched, then the process goes to step 23 for executing a regular process described later, followed by returning to step 21. If the control mode is under switching, then the process goes to step 24 for executing a switching process, followed by returning to step 21. The switching process executed in step 24 is a process in which the switching of the control mode is controlled while adjusting the on/off timing of the thyristor 43, etc. so that the power supply will not cause troubles such as a short-circuit.

Figure 7:
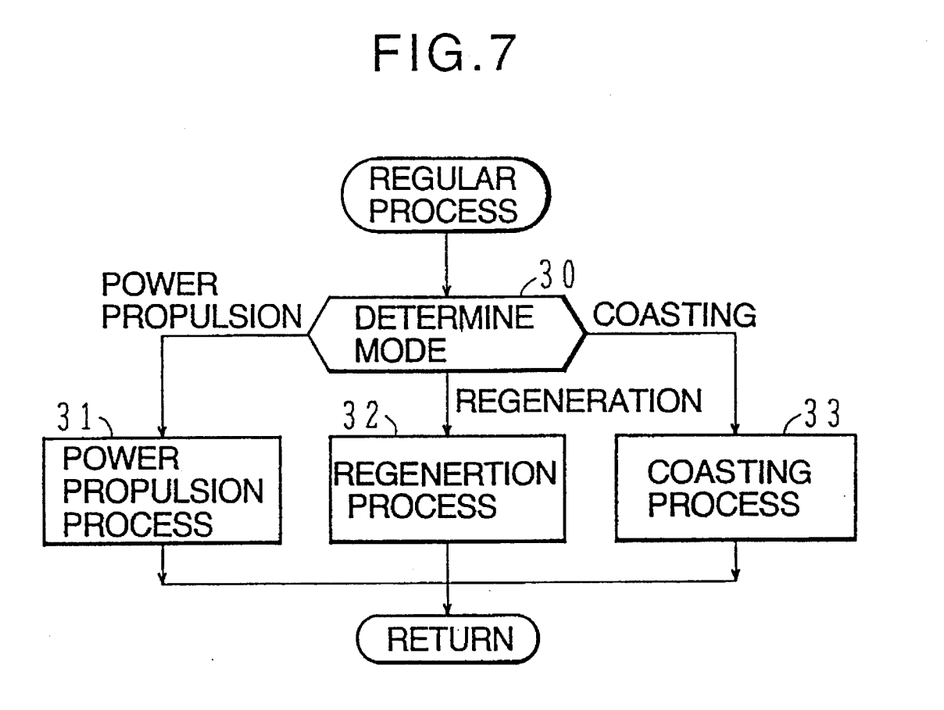
FIG. 7 is a schematic flowchart for the regular process in the flowchart of FIG. 5.
Figure 8A:
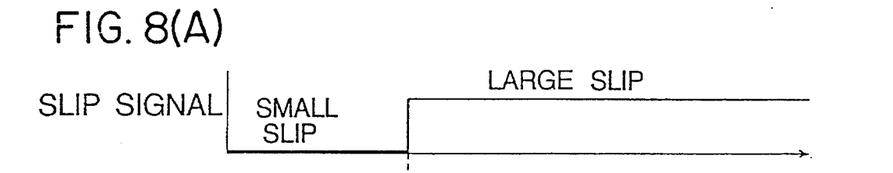
Figure 8B:
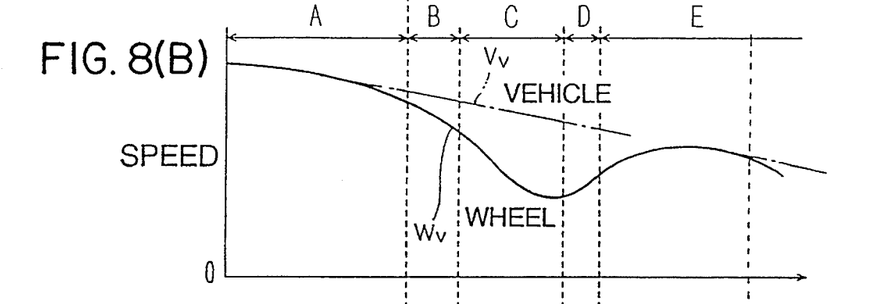
Figure 8C:
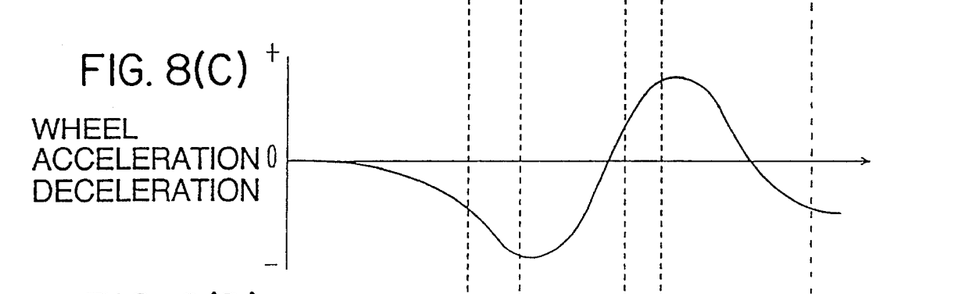
Figure 8D:
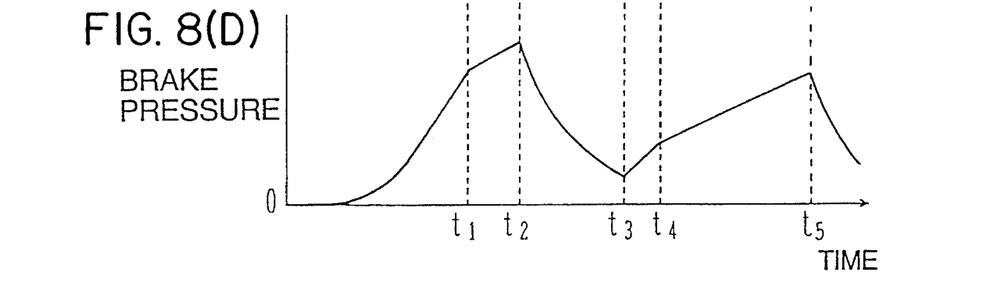

FIG. 7 shows a flow of the regular process executed in step 23 of FIG. 5. In step 30 of FIG. 7, the control mode selected in step 21 is determined. Subsequently, the process goes to step 31 if the power propulsion mode is selected, to step 32 if the regeneration or large regeneration mode is selected, and to step 33 if the coasting mode is selected. In the respective steps, the above-described processes for power propulsion, regeneration, and coating are executed, followed by returning to the mode selection in step 21.

FIG. 8 shows a slip prevention control cycle implemented by a brake controller 92. More specifically, FIG. 8(a) represents the magnitude of the slip signal and FIG. 8(b) represents the wheel speed. Also, FIG. 8(c) represents the wheel acceleration/deceleration and FIG. 8(d) represents the brake pressure.

Referring to FIG. 8, in a region A from the origin till a time $t_1$, the slip is small, the brake pedal 4 is trod on, the braking force is increased by the brake controller 2 until a preset vehicle deceleration, and the regenerative braking is applied in the large regeneration mode. In a region B from the time $t_1$ to a time $t_2$, the braking force is gradually increased by the brake controller 2 until a predetermined value of the slip ratio. Since the slip is large in this region B and thereafter, the regenerative braking is applied in the regeneration mode.

In a next region C from the time $t_2$ to a time $t_3$, the braking pressure is released by the brake controller 2 until the slip ratio is reduced. This region C is under the regeneration mode. As a result, the wheels are prevented from being locked and stability of the vehicle is maintained.

In a region D from the time $t_3$ to a time $t_4$, the braking force is increased by the brake controller 2 until the wheel acceleration reaches a present value. Further, in a region E from the time $t_4$ to a time $t_5$, the braking force is gradually increased by the brake controller 2 until the predetermined value of the slip ratio, as with the region B. The above operations from the region B to the region D are then repeated to stably stop the vehicle in a short time.

Herein, as previously described, respective speeds Wv and accelerations of the wheels 8a, 8b, 8c, 8d are determined by the brake controller 2 from the detection signals of the wheel rotation number sensors 10a, 10b, 10c, 10d. Also, the vehicle speed is calculated through computations from the speeds and accelerations of all the wheels, thereby obtaining a vehicle speed Vv as indicated by a one-dot-chain line. The slip ratio is given as a ratio of the speed difference between the outer circumferential speeds of the wheels 8a, 8b, 8c, 8d and the calculated vehicle speed Vv to the vehicle speed Vv.

According to one embodiment of the present invention, as described above, when the wheel slip is small (e.g., the slip ratio is not greater than 0.2) under the condition that the brake is being actuated, the braking force is increased by the brake controller 2 and, simultaneously, the regenerative braking force is made by the motor controller 1 larger than the normal regenerative braking force. When the wheel slip is large (e.g., the slip ratio is greater than 0.2), the braking force is reduced by the brake controller 2 and, simultaneously, the normal regenerative braking is applied by the motor controller 1. Thus, under the condition that the brake is being actuated, the anti-lock brake effected by the brake controller 2 and the regenerative braking effected by the motor controller 1 cooperate properly so that the slip ratio comes closer to 0.2, thereby stably stopping the vehicle in a short time. It is therefore possible to realize a braking apparatus for an electric vehicle in which a mechanical anti-lock brake and regenerative braking are combined with each other and hence a braking performance is improved.

While the above embodiment is arranged as setting the control mode of the motor controller 1 to the regeneration mode when the slip is large, it may be arranged to set the control mode to the coasting mode rather than the regeneration mode.

Figure 9:
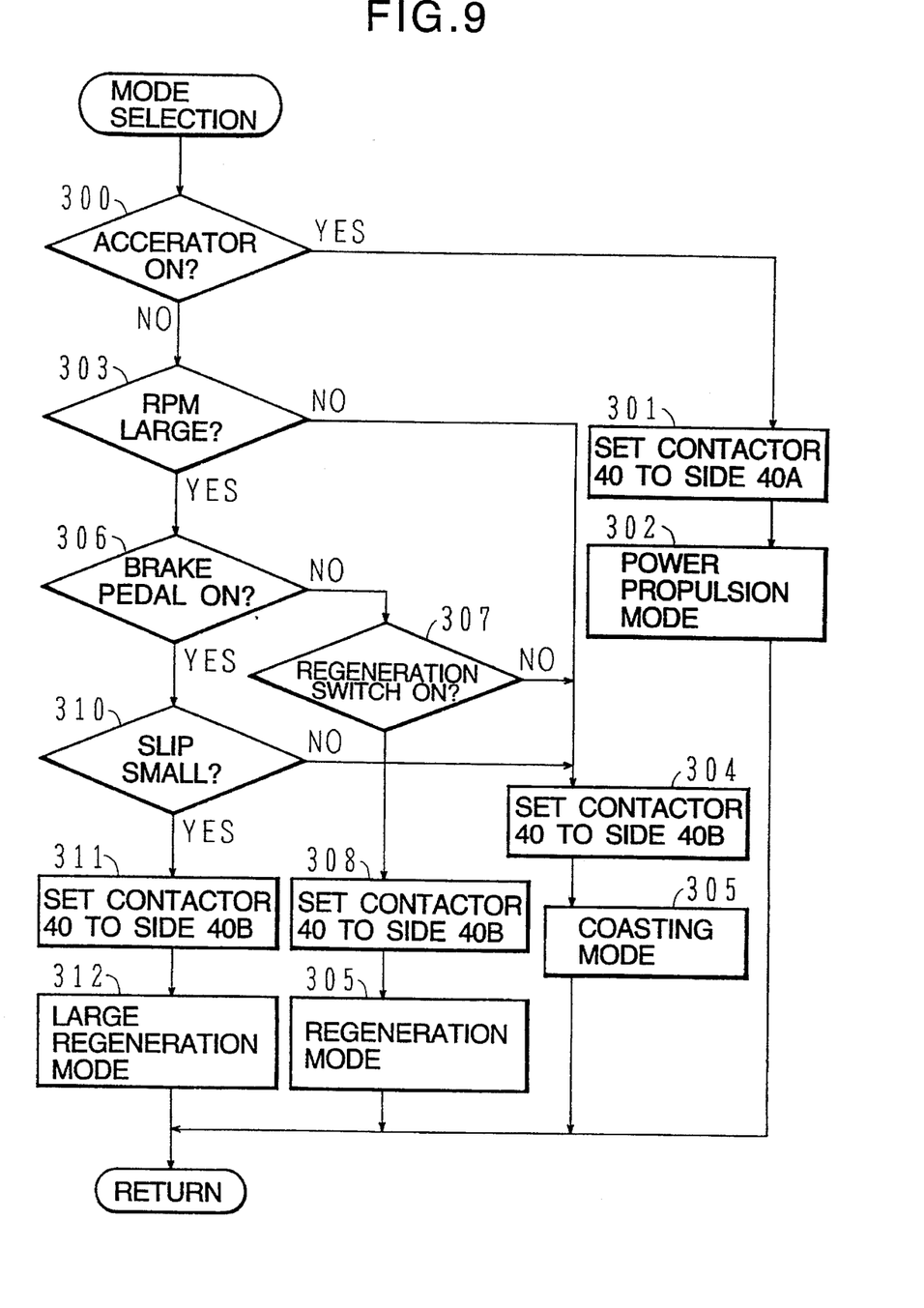
FIG. 9 is a flowchart for control mode selection in another embodiment of the present invention.

FIG. 9 is a flowchart for control mode selection executed by the motor controller 1 in another embodiment of the present invention. The embodiment of FIG. 9 corresponds to the case where the control mode is set, as suggested above, to the coasting mode rather than the regeneration mode when the slip is large.

If the slip is not small in step 310 of FIG. 9, the process goes via step 304 to step 305 for setting the coasting mode. Since the flowchart of FIG. 9 is the same as that of FIG. 9 except the above process including step 310, the remaining part of the former flowchart will not described here. By so setting the coasting mode when the slip is large, the slip ratio can be more quickly reduced to 0.2 or thereabout from a larger value. It is therefore possible to realize a braking apparatus for an electric vehicle in which the braking performance is further improved.

While the above embodiments are arranged as supplying the slip signal from the brake controller 2 to the motor controller 1, the brake pressure command signal may be supplied, instead of the slip signal, from the brake controller 2 to the motor controller 1.

Figure 10:
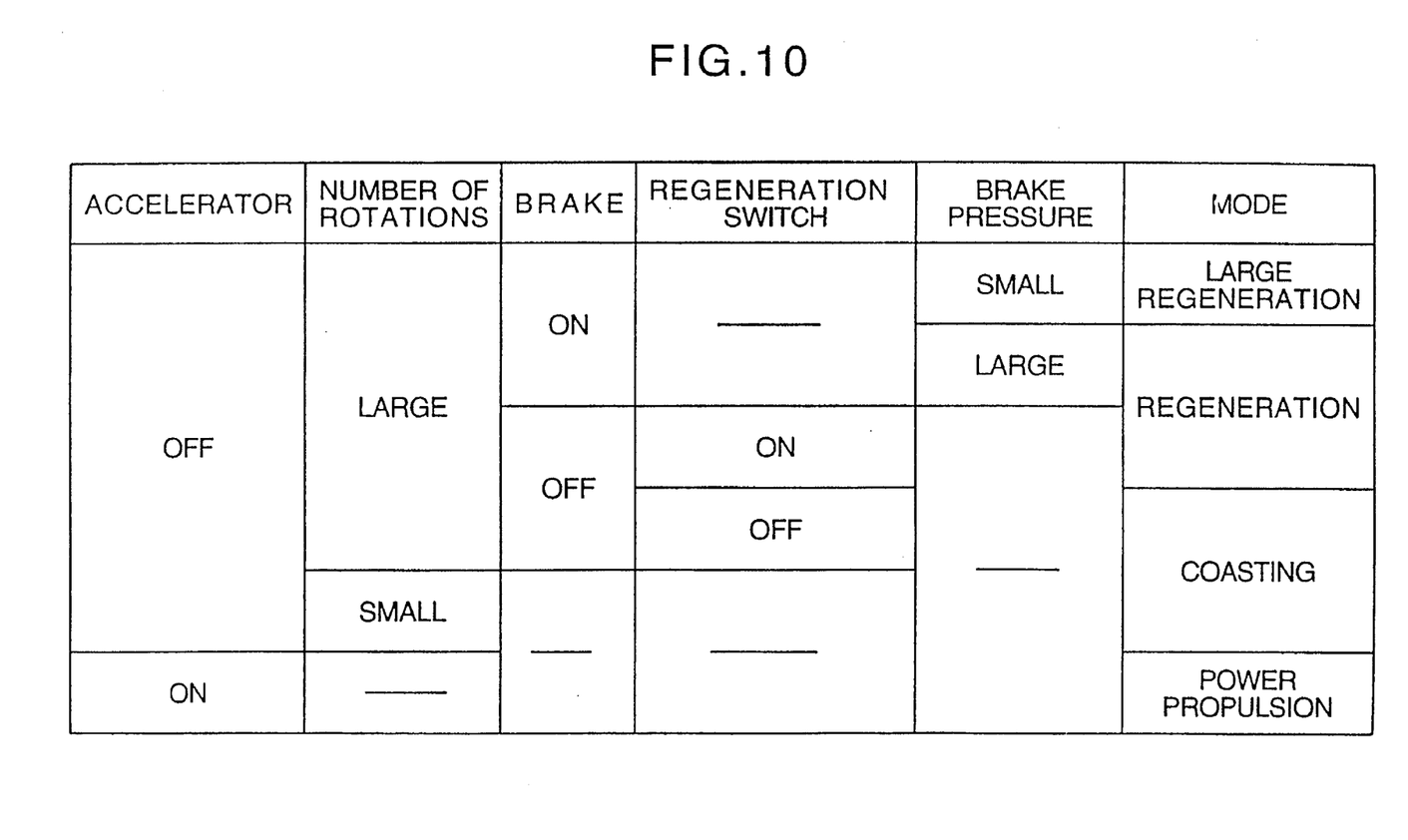
FIG. 10 is a diagram showing a control mode selection logic in still another embodiment of the present invention.
Figure 11:
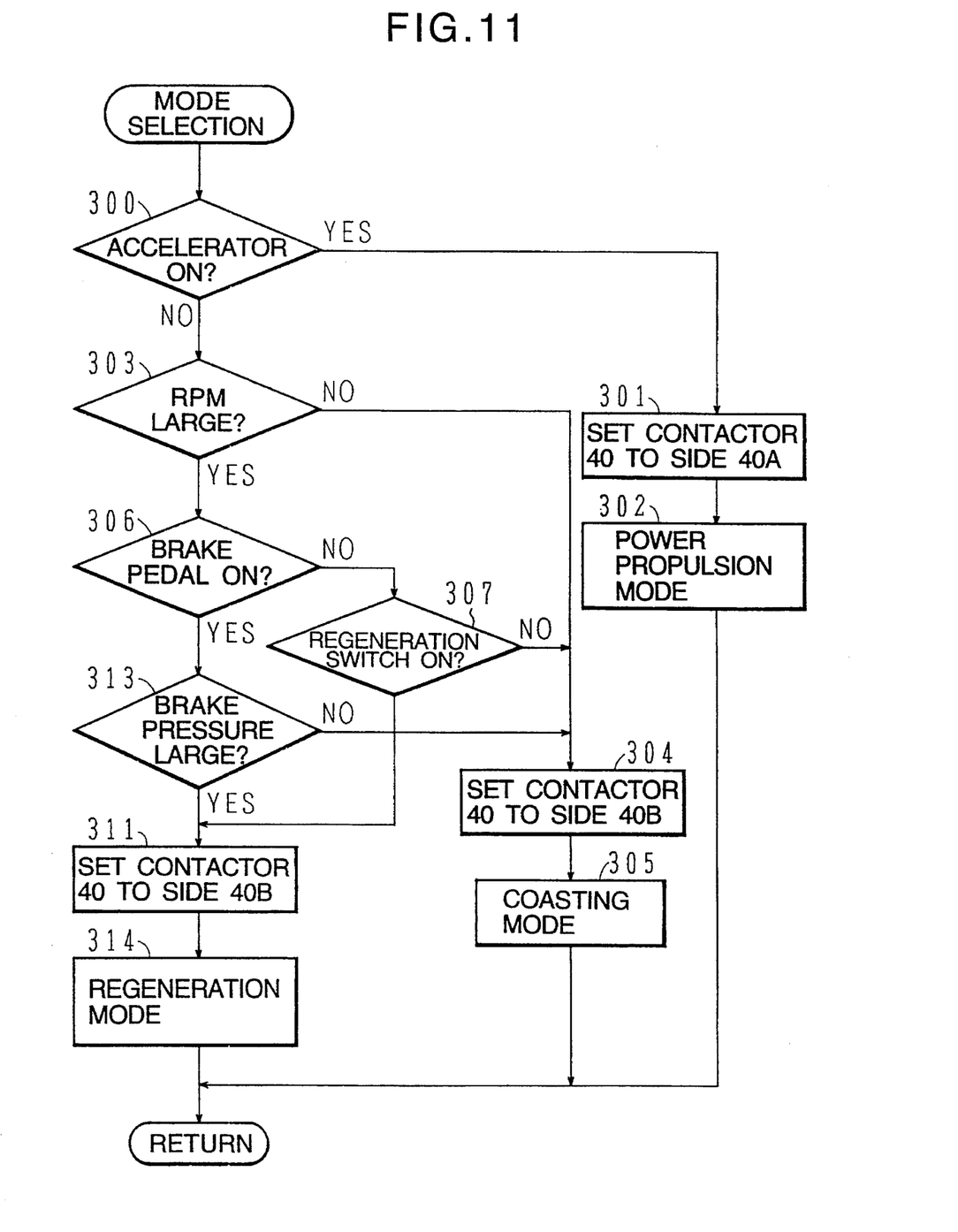
FIG. 11 is a flowchart for mode selection in the embodiment of FIG. 10.

FIG. 10 is a diagram showing a control mode selection logic in still another embodiment of the present invention, and FIG. 11 is a flowchart for control mode selection. The embodiment of FIG. 10 corresponds to the case of supplying the brake pressure command signal to the logic selector 1d of the motor controller 1.

As seen from FIG. 10, on condition that the accelerator pedal 3 is released off, the wheel rotation number is large, and the brake pedal 4 is trod on, the control mode is set to the coasting mode when the brake pressure signal has a small value, and to the regeneration mode when the brake pressure signal has a large value. More specifically, when the brake pressure signal has a small value, the slip ratio is large and, therefore, the coasting mode is selected without applying the regenerative braking. When the brake pressure signal has a large value, the slip ratio is small and, therefore, the regenerative braking is applied so that the wheel speed is reduced with both the braking force produced by the brake actuator 11 and the braking force produced by the regenerative braking. Selection of the other control modes is carried out in the same manner as in the embodiment of FIG. 2 and hence will not be described here.

In FIG. 11, steps 300 to 306 are the same as steps 300 to 306 in FIG. 9. If the regeneration switch 5 is turned off in step 307 of FIG. 11, then the process goes to step 304. If the regeneration switch 5 is turned on in step 307, then the process goes to step 311. If the brake pedal 4 is trod on in step 306, then the process goes to step 313 to determine whether the brake pressure is large or not. If the brake pressure is not large, then the process goes to step 304 and, if it is large, then the process goes to step 311. In step 311, the contactor 40 is set to the side of the terminal 40B. Subsequently, the regeneration mode is set in step 314. After that, the process returns to the main routine as shown in FIG. 5.

Whether the brake pressure is large or small is determined based on whether the tread amount of the brake pedal 4 is larger or smaller than a preset value. By way of example, whether the brake pressure is large or small is determined based on whether the tread amount of the brake pedal 4 is larger or smaller than 50% of the allowable maximum tread amount.

The embodiment of FIGS. 10 and 11 can also provide the similar advantage to that in the embodiment of FIG. 9.

While the control mode is set to the regeneration mode in the embodiment of FIG. 10 when the brake pressure is large, it may be set to the large regeneration mode similarly to the embodiment of FIG. 1.

Furthermore, the regenerative braking includes not only a process of supplying the generated electrical energy to the battery 41 for braking the vehicle, but also a process of converting the generated electrical energy into heat through an electric resistor or the like for braking the vehicle. Accordingly, the above-described embodiment may be modified to convert the generated electrical energy into heat through an electric resistor.

The present invention described hereinabove has the following advantage.

Thus, in a braking apparatus for braking control of an electric vehicle comprising a traveling electric motor, brake operating means, accelerator operating means, and wheel braking means, the inventive braking apparatus further comprises wheel braking control means for calculating a slip ratio between wheels and a road surface, and controlling the wheel braking means so that the slip ratio is kept at a predetermined value, and electric braking means operated in accordance with the magnitude of a signal corresponding to the slip ratio calculated by the wheel braking control means and a tread signal from the brake operating means for regeneratively braking the traveling electric motor when the slip ratio is smaller than the predetermined value.

As a result, it is possible to realize a braking apparatus for an electric vehicle in which a mechanical antilock brake as mechanical braking means and electrical regenerative braking cooperate with each other and hence a braking performance is improved.

What is claimed is:

1. A braking apparatus for controlling the braking of an electric vehicle, comprising a traveling electric motor for driving wheels of the electric vehicle, brake operating means associated with at least the driving wheels, accelerator operating means, mechanical anti-lock braking means for braking the associated wheels in accordance with operation of said brake operating means, means for determining a slip ratio between the associated wheels and a road surface and controlling said mechanical anti-lock braking means to maintain said slip ratio at a predetermined value, and electric braking means operatively associated with said determining-and-controlling means and comprising first mode means for obtaining a first regeneration mode to produce braking torque by the electric motor, second mode means for obtaining a second regeneration mode to produce a smaller braking torque than in the first regeneration mode, third mode means for obtaining a coasting mode, and fourth mode means for obtaining a power propulsion mode absent regenerative braking torque produced by the electric motor, and logic selecting means operatively associated with the first mode means, the second mode means, the third mode means and the fourth mode means for selecting one of the first regeneration mode, the second regeneration mode, the coasting mode and the power propulsion mode, in response to data comprising wheel rotations, brake tread amount, slip and on-off regeneration and selectively regeneratively braking said traveling electric motor at least when the slip ratio is smaller than said predetermined value in accordance with the magnitude of a signal corresponding to the determined slip ratio, such that the mechanical anti-lock braking means and the electric braking means are operatively associated for approximating the predetermined range of the slip ratio under a variety of driving conditions to obtain braking while preventing skidding.

2. A braking apparatus for an electric vehicle according to claim 1, wherein said electric braking means brakes said traveling electric motor when the slip ratio is reduced by said wheel braking control means, while setting a regenerative braking force produced when the slip ratio is smaller than said predetermined value to be larger than a regenerative braking force produced when the slip ratio exceeds said predetermined value.

3. A braking apparatus for an electric vehicle according to claim 2, further comprising regeneration selecting means for selecting whether regenerative braking is to be applied or not, wherein when said regeneration selecting means is set to apply the regenerative braking, said electric braking means brakes said electric motor with the regenerative braking upon determining the condition that said brake operating means and said accelerator operating means are both not operated.

4. A braking apparatus for an electric vehicle according to claim 1, wherein said electric braking means brakes said electric motor with the regenerative braking when the slip ratio is smaller than said predetermined value, and stops the regenerative braking when the slip ratio exceeds said predetermined value.

5. A braking apparatus for an electric vehicle according to claim 4, further comprising regeneration selecting means for selecting whether regenerative braking is to be applied or not, wherein when said regeneration selecting means is set to apply the regenerative braking, said electric braking means brakes said electric motor with the regenerative braking upon determining the condition that said brake operating means and said accelerator operating means are both not operated, while setting a regenerative braking force produced when the slip ratio is smaller than said predetermined value to be larger than a regenerative braking force produced when said regeneration selecting means is set to apply the regenerative braking.

6. A braking apparatus for an electric vehicle according to claim 4, wherein a brake pressure signal indicating a brake pressure of said wheel braking means is supplied to said electric braking means, and said electric braking means brakes said electric motor with the regenerative braking when the brake pressure signal exceeds a predetermined pressure value, and stops the regenerative braking when the brake pressure signal is smaller than said predetermined pressure value.

7. A braking apparatus for an electric vehicle according to claim 6, further comprising regeneration selecting means for selecting whether regenerative braking is to be applied or not, wherein when said regeneration selecting means is set to apply the regenerative braking, said electric braking means brakes said electric motor with the regenerative braking upon determining the condition that said brake operating means and said accelerator operating means are both not operated.

\* \* \* \* \*